(12) United States Patent
Kim

(10) Patent No.: US 6,522,310 B1
(45) Date of Patent: Feb. 18, 2003

(54) 3-DIMENSIONAL IMAGE APPARATUS BASED ON POLARIZING METHOD

(75) Inventor: Sung-sik Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/208,849

(22) Filed: Dec. 10, 1998

(30) Foreign Application Priority Data

Dec. 10, 1997 (KR) .............................................. 97-67523

(51) Int. Cl.[7] .................................................. G09G 5/00
(52) U.S. Cl. .................... 345/6; 345/7; 345/8; 345/630; 345/462
(58) Field of Search ..................... 345/6, 8, 7; 359/630, 359/462

(56) References Cited

U.S. PATENT DOCUMENTS

| | | | | |
|---|---|---|---|---|
| 5,793,341 A | * | 8/1998 | Omori et al. ................... | 345/8 |
| 5,880,883 A | * | 3/1999 | Sudo ........................... | 359/462 |
| 6,054,969 A | * | 4/2000 | Haisma ......................... | 345/7 |
| 6,061,489 A | * | 5/2000 | Ezra et al. .................... | 385/115 |
| 6,130,784 A | * | 10/2000 | Takahashi ...................... | 359/630 |

* cited by examiner

Primary Examiner—Richard Hjerpe
Assistant Examiner—Kevin M. Nguyen
(74) Attorney, Agent, or Firm—Robert E. Bushnell, Esq.

(57) ABSTRACT

A 3-dimensional image apparatus based on a polarizing method is disclosed. The apparatus includes: a stereo camera unit in which two integrated cameras picture an object for a left eye and a right eye at different angles; a 3-dimensional image display unit for outputting left eye and right eye images pictured by the stereo camera unit through an additional image display apparatus, for polarizing the images outputted from the image display apparatus to have a 90° phase difference therebetween, and for outputting the polarized images in two directions using more than two reflection mirrors; and a polarizing glass formed of polarizing lenses having 90° phase difference for transferring a left eye image polarized and outputted from the 3-dimensional image display unit to a left eye and a right eye image to a right eye of a viewer, thereby preventing image loss by viewing the 3-dimensional image in two directions and significantly decreasing the volume and weight of the system by using an LCD as a display unit in contrast to use of a CRT as a display apparatus in the conventional art.

19 Claims, 2 Drawing Sheets

3-DIMENSIONAL IMAGE APPARATUS BASED ON POLARIZING METHOD

CLAIM OF PRIORITY

This application makes reference to, incorporates the same herein, and claims all benefits accruing under 35 U.S.C. §119 from an application for 3-DIMENSIONAL IMAGE APPARATUS BASED ON POLARIZING METHOD earlier filed in the Korean Industrial Property Office on the 10$^{th}$ of December 1997 and there duly assigned Ser. No. 67523/1997.

BACKGROUND OF THE INVENTION

1. Field of the Invention

The present invention relates to the field of stereoscopic television and computer graphics processing, and in particular to the use of polarization to separate the left eye and right eye images.

2. Description of the Related Art

Recently, as image display techniques have advanced, the need for a 3-dimensional image viewing apparatus to aid in processing a large amount of information, thereby maximizing a visual effect, has increased. There has been rapid development of these techniques. Other applications include 3-dimensional simulation, games, advertising, and virtual reality which are implemented using an image which is artificially generated by a computer in the current image processing technique, for thereby experiencing a virtual world which does not actually exist.

The above-described 3-dimensional image is implemented using a difference in the views of the left and right eyes for generating a viewing depth of an object based on human eyes. A 3-dimensional image apparatus based on a polarizing method is implemented by the above-described principle. In this method, the left and right images displayed by a polarizing filter are transferred to the left and right eyes through another polarizing filter such as a polarizing glass having the same polarizing angle.

One example of a 3-dimensional image apparatus based on the conventional polarizing method is designed for a medical application. A natural 3-dimensional image is displayed, so that a doctor can perform an accurate and stable operation such as an endoscope operation, a special operation, etc. The 3-dimensional image apparatus based on a conventional polarizing method includes a stereo camera unit in which two cameras picture an object using left and right eyes at different angles, a 3-dimensional image display unit for polarizing the left and right images pictured by the stereo camera unit in one direction so as to have a 90° phase difference and passing and reflecting the same in one direction using a half reflection mirror, a phase converting mirror for inverting the left and right sides of the 3-dimensional image outputted from the left eye camera of the stereo camera unit, an image storing unit for storing the left and right eye images pictured by the stereo camera unit into a predetermined medium in accordance with an externally inputted instruction or outputting the images stored therein, and polarizing glasses formed of polarizing lenses having a 90° phase difference, so that the left eye image polarized by the 3-dimensional display unit is transferred to the left eye of the viewer, and the right image is transferred to the right eye of the viewer.

The stereo camera unit is generally formed of CCD cameras. Namely, there are provided a right eye CCD camera and left eye CCD camera which are integrated and correspond to the right eye and the left eye, respectively. In addition, the 3-dimensional display unit includes a right eye CRT monitor for receiving a right eye image pictured by the right eye CCD camera of the stereo camera unit and displaying the same on the screen, a right eye polarizing plate for polarizing the image displayed by the right eye CRT monitor in a predetermined direction, a left eye CRT monitor mounted at a portion perpendicular to the right eye CRT monitor for displaying the left eye image pictured by the left eye CCD camera on the screen, a left eye polarizing plate mounted at a portion perpendicular to the right eye polarizing plate for displaying the image displayed by the left eye CRT monitor so as to have a predetermined 90° phase difference with the image polarized by the right eye polarizing plate, and a half reflection mirror for reflecting 50% of the image polarized by the right eye polarizing plate and the left eye polarizing plate in the direction reverse to the direction of the left eye polarizing plate and the right eye polarizing plate and passing the remaining 50% of the light without deflection. The image storing unit which operates in accordance with an external instruction includes a VCR for storing a left eye and right eye image pictured by the stereo camera and outputting the stored image to the 3-dimensional image display unit through the image converting mirror, an input interface unit for performing a signal interface between the stereo camera unit and the VCR, and an output interface unit for performing a signal interface between the VCR and the 3-dimensional image display unit.

The operation of the 3-dimensional image apparatus based on the conventional polarizing method will be explained. First, the right eye CCD camera and the left eye CCD camera correspond to two eyes of a human body and are spaced apart by about 65–75 mm, and the right eye and left eye images are pictured and then are transferred to the right eye CRT monitor and the left eye CRT monitor. At this time, since the right eye polarizing plate and the left eye polarizing plate are perpendicularly disposed on the front surface of the right eye CRT monitor and the left eye CRT monitor, the images outputted have a phase difference of 90°. The half reflection mirror reflects 50% of the incident light, and passes the remaining 50% of the light. Therefore, an observer using polarizing glasses views the right eye image outputted from the right eye CRT monitor through the half reflection mirror through the right polarizing plate, and views the left eye image outputted from the left eye CRT monitor which passes through the left eye polarizing plate and is reflected by the half reflection mirror, so that the right eye image is transferred to the right eye, and the left eye image is transferred to the left eye.

Here, since the left eye image outputted from the left eye CRT monitor is reflected by the half reflection mirror, the left and right side images are inverted. In order to normally view the images, in this case, an image conversion mirror is used for inverting the left and right sides of the images outputted from the left eye camera of the stereo camera unit.

In addition, the image storing unit stores the left eye and right eye images in the VCR in accordance with an external instruction and outputs the stored images in accordance with an external instruction. However, in the 3-dimensional image apparatus based on a conventional polarizing method, only one observer can view the 3-dimensional image. For example, when performing an endoscopy operation, a main doctor performs the operation while viewing the portions to be treated, and an assistant doctor assists in the operation while viewing the portion to be treated using another set of the 3-dimensional image apparatus based on the conventional polarizing method. Therefore, the volume and weight of the 3-dimensional image unit using the CRT is increased, so that more space is needed, and the fabrication cost of the system is increased.

In addition, since the left and right images are mixed by 50% and then are outputted using the half reflection mirror, the quality of the image is decreased compared to the original images pictured. This may cause an error in the operation.

SUMMARY OF THE INVENTION

It is therefore an object of the present invention to provide an improved 3-dimensional image apparatus.

It is a further object of the present invention to provide a 3-dimensional image apparatus which can be viewed by more than one observer.

It is a yet further object of the invention to provide a 3-dimensional image apparatus which has improved image quality.

It is a still further object of the invention to provide a 3-dimensional image apparatus which fully utilizes the output light.

It is a still-yet further object of the present invention to provide a 3-dimensional image apparatus having reduced size and weight.

In order to achieve the above objects, the present invention provides a 3-dimensional image apparatus based on a polarizing method which is capable of preventing image loss by viewing the 3-dimensional image in two directions and which significantly decreases volume and weight of the system compared to the systems using CRT displays by using an LCD as a display unit. There is provided a 3-dimensional image apparatus based on a polarizing method according to a first embodiment of the present invention which includes a stereo camera unit in which two integrated cameras picture an object for a left eye and right eye at different angle, a 3-dimensional image display unit for outputting left eye and right eye images pictured by the stereo camera unit through an additional image display apparatus, polarizing the images outputted from the image display apparatus to have a 90° phase difference therebetween and outputting the polarizing images in two directions using more than two reflection mirrors, and polarizing glasses formed of polarizing lenses having 90° phase difference for transferring a left eye image polarized and outputted from the 3-dimensional image display unit to a left eye and the right eye image to a right eye of a viewer.

In order to achieve the above objects, there is provided a 3-dimensional image apparatus based on a polarizing method according to a second embodiment of the present invention which includes a stereo camera unit in which two integrated cameras picture an object for a left eye and right eye at different angles, a 3-dimensional image display unit for outputting left eye and right eye images pictured by the stereo camera unit through an additional image display apparatus, polarizing the images outputted from the image display apparatus to have a 90° phase difference therebetween and outputting the polarized images in two directions using more than two reflection mirrors, a polarizing glass formed of polarizing lenses having a 90° phase difference for transferring a left eye image polarized and outputted from the 3-dimensional image display unit to a left eye and the right eye image to a right eye of a viewer, and an image storing unit for storing a left eye image and a right eye image pictured by the stereo camera unit into a predetermined medium in accordance with an external instruction and outputting the thusly stored images.

Additional advantages, objects and features of the invention will be set forth in part in the description which follows, and in part will become apparent to those having ordinary skill in the art upon examination of the following, or may be learned from practice of the invention. The objects and advantages of the invention may be realized and attained as particularly pointed out in the appended claims as a result of the experiment compared to the conventional arts.

BRIEF DESCRIPTION OF THE DRAWINGS

A more complete appreciation of the invention, and many of the attendant advantages thereof; will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
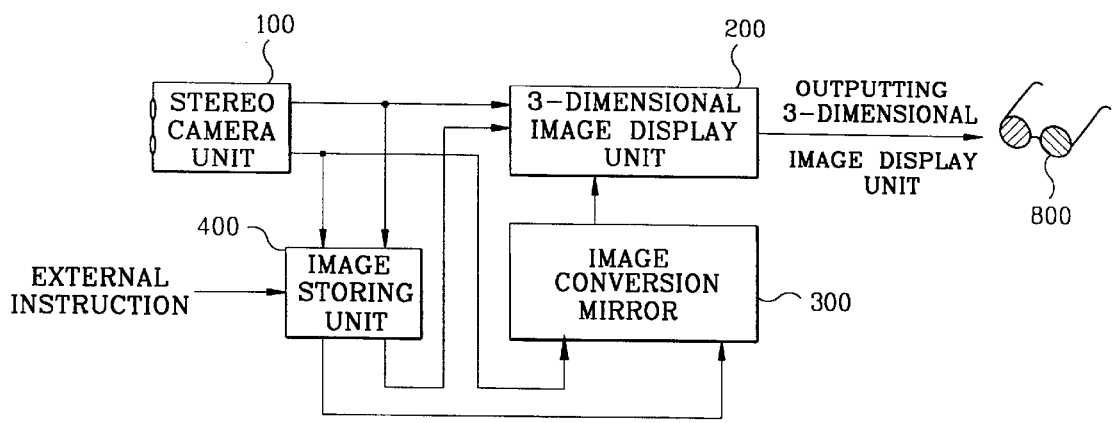
FIG. 1 is a block diagram illustrating a 3-dimensional image apparatus based on a conventional polarizing method.
Figure 2:
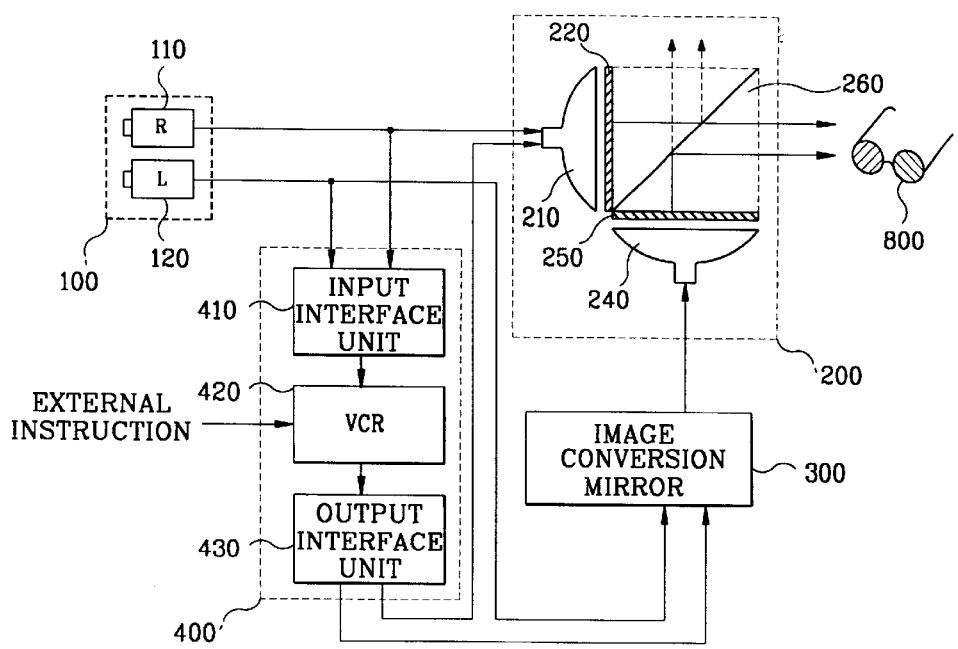
FIG. 2 is a detailed block diagram illustrating another construction of FIG. 1.

Turning now to the drawings, FIG. 1 is a block diagram illustrating a 3-dimensional image apparatus based on a conventional polarizing method, and FIG. 2 is a detailed block diagram illustrating another construction of FIG. 1. The 3-dimensional image apparatus based on the conventional polarizing method as shown in FIG. 2 is designed for a medical application. A natural 3-dimensional image is displayed, so that a doctor can perform an accurate and stable operation such as an endoscope operation, a special operation, etc.

As shown in FIG. 1, the 3-dimensional image apparatus based on a conventional polarizing method includes stereo camera unit 100 in which two cameras picture an object using left and right eyes at different angle, 3-dimensional image display unit 200 for polarizing the left and right images pictured by stereo camera unit 100 in one direction to have a 90° phase difference and passing and reflecting the same in one direction using a half reflection mirror, image conversion mirror 300 for converting the left and right sides of the 3-dimensional image outputted from the left eye camera of stereo camera unit 100, image storing unit 400 for storing the left and right eye images pictured by stereo camera unit 100 into a predetermined medium in accordance with an externally inputted instruction or outputting the images stored therein, and polarizing glasses 800 formed of polarizing lenses having a 90° phase difference, so that the left eye image polarized by 3-dimensional display unit 200 is transferred to the left eye of the viewer, and the right image is transferred to the right eye of the viewer.

As shown in FIG. 2, stereo camera unit 100 is generally formed of CCD cameras. Namely, there are provided right eye CCD camera 110 and left eye CCD camera 120 which are integrated and correspond to the right eye the left eye, respectively. In addition, 3-dimensional image display unit 200 includes right eye CRT monitor 210 for receiving a right eye image pictured by right eye CCD camera 110 of stereo camera unit 100 and displaying the same on the screen, right eye polarizing plate 220 for polarizing the image displayed by right eye CRT monitor 210 in a predetermined direction, left eye CRT monitor 240 mounted at a portion perpendicular to right eye CRT monitor 210 for displaying the left eye image pictured by left eye CCD camera 120 on the screen, left eye polarizing plate 250 mounted at a portion perpendicular to right eye polarizing plate 220 for displaying the image displayed by left eye CRT monitor 240 to have a predetermined 90° phase difference with respect to the image polarized by right eye polarizing plate 220, and half reflection mirror 260 for reflecting 50% of the image polarized by right eye polarizing plate 220 and left eye polarizing plate 250 in a direction reverse to the direction of left eye polarizing plate 250 and right eye polarizing plate 220, and passing the remaining 50% of the same to straightly advance. Image storing unit 400, which operates in accordance with an external instruction, includes VCR 420 for storing a left eye and right eye image pictured by stereo camera 100 and outputting the stored image to 3-dimensional image display unit 200 through image conversion mirror 300, input interface unit 410 for performing a signal interface between stereo camera unit 100 and the VCR 420, and output interface unit 430 for performing a signal interface between VCR 420 and 3-dimensional image display unit 200.

The operation of the 3-dimensional image apparatus based on the conventional polarizing method will be explained. First, right eye CCD camera 110 and left eye CCD camera 120 correspond to two eyes of a human body and are spaced apart by about 65–75 mm, and the right eye and left eye images are pictured and then are transferred to right eye CRT monitor 210 and left eye CRT monitor 240. At this time, since right eye polarizing plate 220 and left eye polarizing plate 250 are perpendicularly disposed on the front surface of right eye CRT monitor 210 and left eye CRT monitor 240, the images outputted have a phase difference of 90°.

Half reflection mirror 260 reflects 50% of the incident light, and passes the remaining 50% of the same. Therefore, an observer using polarizing glasses 800 views the right eye image outputted from right eye CRT monitor 210 through half reflection mirror 260 through right polarizing plate 220, and views the left eye image outputted from the left eye CRT monitor 240 which passes through left eye polarizing plate 250 and is reflected by half reflection mirror 260, so that the right eye image is transferred to the right eye, and the left eye image is transferred to the left eye.

Here, since the left eye image outputted from left eye CRT monitor 240 is reflected by half reflection mirror 260, the left and right side images are inverted. In order to normally view the images, in this case, image conversion mirror 300 is used for inverting the left and right sides of the images outputted from the left eye camera 120 of stereo camera unit 100. In addition, image storing unit 400 stores the left eye and right eye images in VCR 420 in accordance with an external instruction and outputs the stored images in accordance with an external instruction.

However, in the 3-dimensional image apparatus based on a conventional polarizing method, only one observer can view the 3-dimensional image. For example, when performing an endoscopy operation, a main doctor performs the operation while viewing the portions to be treated, and an assistant doctor assists the operation while viewing the portion to be treated using another set of the 3-dimensional image apparatus based on the conventional polarizing method as shown in FIG. 2. Therefore, the volume and weight of the 3-dimensional image unit using the CRT is increased, so that more space is needed, and the fabrication cost of the system is increased. In addition, since the left and right images are mixed by 50% and then are outputted using the half reflection mirror, the quality of the image is decreased compared to the original images pictured. This may cause an error in the operation.

Figure 3:
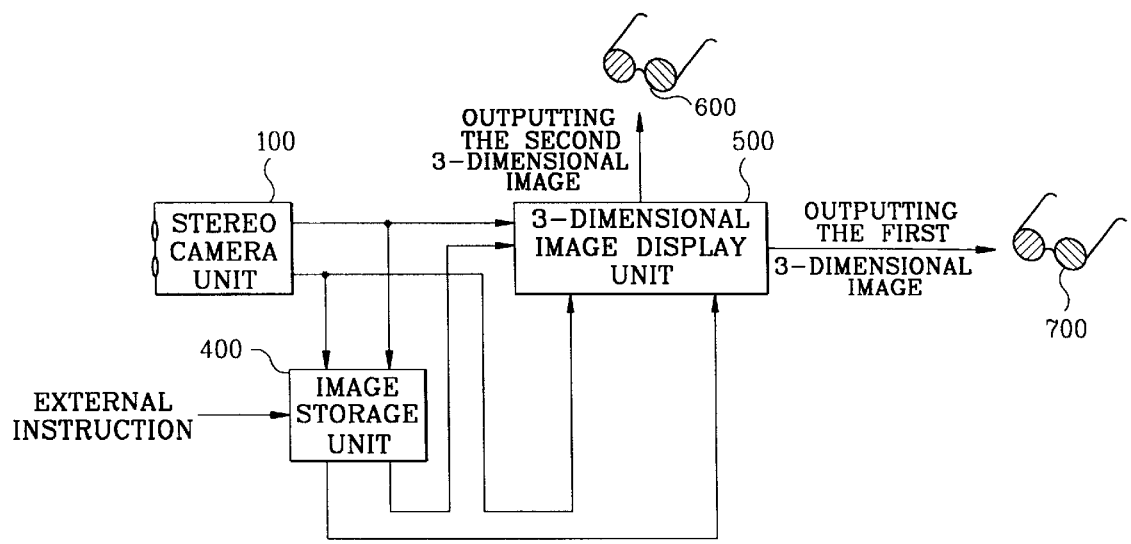
FIG. 3 is a block diagram illustrating a 3-dimensional image apparatus based on a polarizing method according to the present invention.

The 3-dimensional image apparatus based on a polarizing method according to the present invention will now be explained with reference to FIGS. 3 and 4. FIG. 3 illustrates a 3-dimensional image apparatus based on a polarizing method according to the present invention. As shown therein, the 3-dimensional image apparatus based on a polarizing method according to the present invention includes stereo camera unit 100 in which the cameras picture an object at different angles for a left eye and right eye, 3-dimensional image display unit 500 for outputting the left eye and right eye images pictured by stereo camera unit 100 through a predetermined image display apparatus, polarizing each image from the image display apparatus to have a phase of 90° and outputting the same in different directions using two reflection mirrors, polarizing glasses 600 and 700 formed of polarizing lenses having 90° phase difference for transferring the left eye image to a left eye of an observer and the right eye image to a right eye of the observer, and image storing unit 400 for storing the left eye and right eye images pictured by the stereo camera unit 100 into a predetermined medium or outputting the images stored. In the present invention, image conversion mirror 300 is not used, as contrasted with the conventional 3-dimensional image apparatus based on a polarizing method as shown in FIG. 1. In addition, polarized glasses 600 and 700 are provided for implementing an observation in two different directions.

Figure 4:
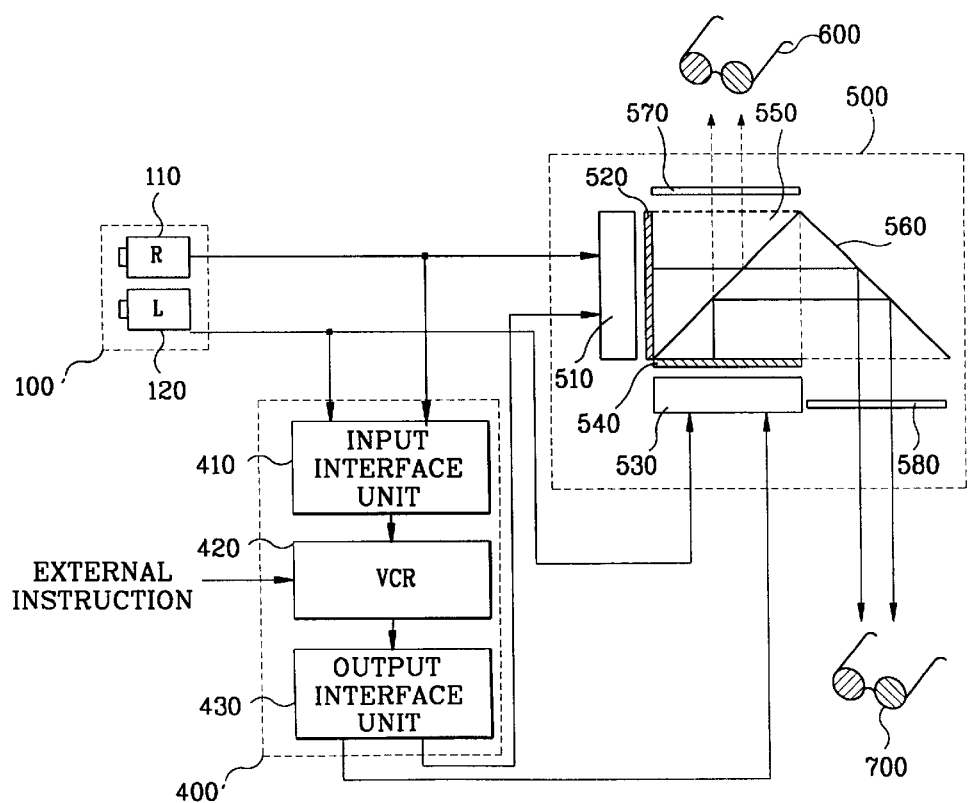
FIG. 4 is a detailed block diagram illustrating an example of FIG. 3.

FIG. 4 is a detailed block diagram illustrating an embodiment of the invention of FIG. 3. As shown therein, in the 3-dimensional image apparatus based on a polarizing method according to the present invention, 3-dimensional image display unit 500 is disposed in conjunction with elements shown previously in FIG. 2, here arranged for a medical purpose. However, image conversion mirror 300, used in FIG. 2 to invert the left and right sides of the image, is not present here, and two sets polarized glasses 600 and 700, respectively, are provided.

Therefore, the description of the elements of FIG. 4 previously shown in FIG. 2 will be omitted except for the inventive features of the present invention. Image display unit 500 as shown in FIG. 4 includes right eye LCD apparatus 510 for receiving a right eye image pictured by stereo camera unit 100 and for displaying the image on a screen, right eye polarizing plate 520 for polarizing the image that right eye LCD apparatus 510 displays in a predetermined direction, left eye LCD apparatus 530 mounted perpendicular to right eye LCD apparatus 510 for receiving a left eye image pictured by stereo camera unit 100 and for displaying the image on the screen, left eye polarizing plate 540 for polarizing the image that left eye LCD apparatus 530 displays to have a 90° difference with respect to the image polarized by right eye polarizing plate 520, half reflection mirror 550 reflecting 50% of the image polarized by right eye polarizing plate 520 and left eye polarizing plate 540 in a direction reverse to the direction of left eye polarizing plate 540 and right eye polarizing plate 520 and passing through the remaining 50% of the image, full reflection mirror 560 for perpendicularly reflecting the right eye image passed through half reflection mirror 550 and the left eye image reflected by half reflection mirror 550, and for outputting the image in a direction reverse to the advancing direction of the right eye image reflected by full reflection mirror 550, and cover glasses 570 and 580 disposed on the path of the images outputted from half reflection mirror 550 and full reflection mirror 560, respectively, to the outside and forming a part of the housing of the 3-dimensional image display unit.

The operation of the 3-dimensional image apparatus based on a polarizing method according to the present invention will be explained. First, right eye CCD camera 110 and left eye CCD camera 120 which are disposed corresponding to two eyes of a human picture a right eye image and left eye image, respectively, and transmit the thusly pictured left and right images to right eye LCD apparatus 510 and left eye LCD apparatus 530. At this time, since right eye polarizing plate 520 and left eye polarizing plate 540 mounted on the front surface of right eye LCD apparatus 510 and left eye LCD apparatus 530 are perpendicularly disposed to each other, a phase difference of 90° occurs in the images outputted.

Since half reflection mirror 550 reflects 50% of the light and passes the remaining 50% of 44 the same, as viewed by an observer, the left eye image outputted from left eye LCD apparatus 530 is reflected by half reflection mirror 550 through left eye polarizing plate 540, and the right eye image outputted from right eye LCD apparatus 510 passes through right eye polarizing plate 540 and is reflected by half reflection mirror 550. Therefore, the right eye image is transferred to the right eye, and the left eye image is transferred to the left eye for thereby implementing a 3-dimensional image (second 3-dimensional image output).

Here, since the right eye image outputted from right eye LCD apparatus 510 is reflected by half reflection mirror 550, the left and right sides of the image are inverted. Therefore, it is needed to implement a non-inverted image. In order to overcome this problem, in the conventional art, image converting mirror 300 is used. However, in the present invention, a driver for the right eye LCD apparatus is used as a member capable of converting the left and right sides of the image outputted from right eye camera 10 of stereo camera unit 100 for thereby converting the left and right sides of the image displayed from right eye LCD apparatus 510.

However, in view of another observer through another set of polarizing glasses 700, the right eye image outputted from right eye LCD apparatus 510 passes through half reflection mirror 550 and to is reflected by full reflection mirror 560, and then the left and right sides of the image are exchanged, so that the image is viewed normally as a right eye image, and the left eye image outputted from left eye LCD apparatus 530 is reflected by half reflection mirror 550, and is reflected by full reflection mirror 560, so that this image is also viewed normally (first 3-dimensional image output).

In addition, full reflection mirror 560 reflects the left eye image passing through half reflection mirror 550 and the right eye image reflected by half reflection mirror 550, and thus outputs the image in a direction opposite to the advancing direction of the left eye image before being reflected by half reflection mirror 550. At this time, left eye LCD apparatus 530 displays the images having the changed left and right sides based on the above-described principle.

Image storing unit 400 stores the left eye and right eye images into VCR 420 in accordance with an external instruction and outputs the stored images in accordance with an external instruction. Cover glasses 570 and 580 are disposed on the part through which the second and first 3-dimensional images are outputted to polarizing glasses 600 and 700 to thereby form a part of the housing of the 3-dimensional image apparatus based on the polarizing method according to the present invention.

As a result, according to the 3-dimensional image apparatus based on the polarizing method as shown in FIG. 4, since it is possible to display 3-dimensional images in two directions, the portions of the human body to be treated may be concurrently viewed by a main doctor and an assistant doctor using one set of the 3-dimensional image apparatus during the endoscope operation. In addition, since it is possible to view two 3-dimensional images which are outputted in a state that the left and right images are mixed by 50% by the half reflection mirror, it is possible to achieve about 100% image efficiency compared to the images pictured. That is, none of the light is wasted.

At this time, the resolutions of the images which are pictured as darkened portions due to 50% efficiency of each 3-dimensional image may be increased by the left and right eye LCD apparatuses for thereby implementing a high resolution of the system. Since the display apparatus formed of an LCD instead of the CRT is used, the volume and weight of the apparatus is decreased, so that it is possible to obtain more operation space compared to the conventional art in which the CRT is used as a display apparatus.

As described above, in the 3-dimensional image apparatus based on a polarizing method according to the present invention, it is possible to concurrently display the 3 dimensional images in two directions. Therefore, in the present invention it is possible to implement about 100% efficiency of the 3-dimensional image apparatus. In addition, since the LCD is used as a display apparatus instead of the CRT in the significantly conventional art, the volume and weight of the display apparatus is decreased, so that a light and small-sized 3-dimensional image apparatus may be implemented.

Although the preferred embodiments of the present invention have been disclosed for illustrative purposes, those skilled in the art will appreciate that various modifications, additions and substitutions are possible, without departing from the scope and spirit of the invention as recited in the accompanying claims

What is claimed is:

1. A three-dimensional image apparatus, comprising:
   a left eye display and a right eye display for displaying left and right eye images to be received by left and right eyes of a user;
   a left eye polarizing plate disposed in front of said left eye display and a right eye polarizing plate disposed in front of said right eye display, said left eye polarizing plate being oriented at a 90° phase difference with respect to said right eye polarizing plate;
   a half reflecting mirror oriented at an angle relative to said right eye display and said left eye display for viewing the left eye image and the right eye image from a first direction; and
   a full reflecting mirror oriented at an angle to said half reflecting mirror for viewing the left eye image and the right eye image from a second direction;
   wherein light representing one of the left eye image and the right eye image is emitted by a respective one of the left eye display and the right eye display, passes through a respective one of the left eye polarizing plate and the right eye polarizing plate, and then encounters the half reflecting mirror and the full reflecting mirror prior to being viewed by the user;
   said apparatus further comprising a housing comprising a cover glass positioned to allow a user to view an image reflected from said half-reflecting mirror through the cover glass, and an additional cover glass positioned to allow a user to view an image reflected from said full reflecting mirror through the additional cover glass.

2. The apparatus of claim 1, further comprising:

a stereo camera unit having two integrated cameras for providing images to said left eye display and said right eye display.

3. The apparatus of claim 2, further comprising:

an image storage unit for storing images provided by said stereo camera unit.

4. The apparatus of claim 1, wherein each of said left eye display and said right eye display comprises a liquid crystal display.

5. The apparatus of claim 4, further comprising:

a driver for performing a left-to-right inversion on one of said left eye image and said right eye image displayed by said left eye display and said right eye display.

6. The apparatus of claim 1, wherein the image displayed by said left eye display is inverted left-to-right.

7. The apparatus of claim 1, wherein the image displayed by said right eye display is inverted left-to-right.

8. The apparatus of claim 1, wherein:

said left eye display and said right eye display are oriented facing inward at a right angle to each other;

said half-reflecting mirror is oriented at a 45 degree angle with respect to said left eye display and said right eye display; and said full reflecting mirror is oriented at a right angle with respect to said half-reflecting mirror, and has a reflective surface facing said half-reflecting mirror.

9. The apparatus of claim 1, wherein the light representing one of the left eye image and the right eye image encounters the half reflecting mirror and the full reflecting mirror in that order after passing through the respective one of the left eye polarizing plate and the right eye polarizing plate.

10. A three-dimensional image apparatus, comprising:

a left eye display and a right eye display for displaying left and right eye images to be received by left and right eyes of a user;

a left eye polarizing plate disposed in front of said left eye display and a right eye polarizing plate disposed in front of said right eye display, said left eye polarizing plate being oriented at a 90° phase difference with respect to said right eye polarizing plate;

a half reflecting mirror oriented at an angle relative to said right eye display and said left eye display for viewing the left eye image and the right eye image from a first direction; and a full reflecting mirror oriented at an angle relative to said half reflecting mirror for viewing the left eye image and the right eye image from a second direction, said full reflecting mirror being oriented at a right angle with respect to said half reflecting mirror, and having a reflective surface facing said half reflecting mirror;

wherein both the half reflecting mirror and the full reflecting mirror are disposed on a path of light extending between at least one of the left eye polarizing plate and the right eye polarizing plates, on one side, and the user on another side.

11. The apparatus of claim 10, further comprising:

a stereo camera unit having two integrated cameras for providing images to said left eye display and said right eye display.

12. The apparatus of claim 11, further comprising:

an image storage unit for storing images provided by said stereo camera unit.

13. The apparatus of claim 10, herein each of said left eye display and said right eye display comprises a liquid crystal display.

14. The apparatus of claim 13, further comprising:

a driver for performing a left-to-right inversion on one of said left eye image and said right eye image displayed by said left eye display and said right eye display.

15. The apparatus of claim 10, further comprising:

a housing comprising a cover glass positioned to allow a user to view an image reflected from said half-reflecting mirror through the cover glass.

16. The apparatus of claim 15, further comprising:

an additional cover glass positioned to allow a user to view an image reflected from said full reflecting mirror through the additional cover glass.

17. The apparatus of claim 10, wherein the image displayed by at least one of said left eye display and said right eye display is inverted left-to-right.

18. The apparatus of claim 10, wherein:

said left eye display and said right eye display are oriented facing inward at a right angle to each other; and said half-reflecting mirror is oriented at a 45 degree angle with respect to said left eye display and said right eye display.

19. The apparatus of claim 10, wherein light representing one of the left eye image and the right eye image encounters the half reflecting mirror and the full reflecting mirror in that order after passing through a respective one of the left eye polarizing plate and the right eye polarizing plate.

* * * * *